United States Patent [19]
Seguchi et al.

[11] Patent Number: 4,906,525
[45] Date of Patent: Mar. 6, 1990

[54] HEAT-RESISTING SUPPORTING MEMBER

[75] Inventors: Manabu Seguchi; Kazuo Okamura, both of Amagasaki, Japan

[73] Assignee: Sumitomo Metal Industries, Inc., Osaka, Japan

[21] Appl. No.: 947,957

[22] Filed: Dec. 30, 1986

[51] Int. Cl.[4] ........................ B32B 15/16; B32B 15/04; F27D 3/02

[52] U.S. Cl. .................................. 428/469; 428/402; 428/403; 428/323; 432/234; 75/230; 75/232; 75/236; 75/244

[58] Field of Search ................ 432/234; 428/402, 403, 428/469; 75/230, 232, 236, 244

[56] References Cited

U.S. PATENT DOCUMENTS

| | | | |
|---|---|---|---|
| 3,588,059 | 6/1971 | Weineck et al. . | |
| 3,667,932 | 6/1972 | Pops | 75/230 |
| 4,368,038 | 1/1983 | Bourdon et al. | 432/234 |
| 4,505,303 | 3/1985 | Revere et al. | 432/234 |
| 4,601,659 | 7/1986 | Webster et al. | 432/234 |
| 4,604,056 | 8/1986 | Jones | 432/234 |
| 4,609,347 | 9/1986 | Yamashita et al. | 432/234 |
| 4,623,388 | 11/1986 | Jatkar et al. | 75/232 |
| 4,689,009 | 8/1987 | Heuss . | |

OTHER PUBLICATIONS

Patent Abstracts of Japan, vol. 9, No. 138 (C-286)(1861), Jun. 13, 1985 of JP-A-60 26 615 (Shinagawa Shiro-Renga K.K.) 09-02-1985.

*Primary Examiner*—George F. Lesmes
*Assistant Examiner*—Elizabeth M. Cole
*Attorney, Agent, or Firm*—Burns, Doane, Swecker & Mathis

[57] ABSTRACT

The present invention relates to a heat-resisting supporting member, such as a skid button, for supporting a heated material, such as a steel plate, in a high-temperature atmosphere within a heating furnace and the like and provides a heat-resisting supporting member in which a peripheral surface of a lower corner portion of a supporting aggregate formed of heat-resisting alloys with single ceramics, ceramic particles or ceramic bars dispersed therein or heat-resisting alloy-impregnated ceramics formed by impregnating air-pores of porous ceramics with heat-resisting alloys is coated with heat-resisting alloys so as to be capable of being welded to other members while the remaining peripheral surface of the supporting aggregate is coated with a shock-resisting substance formed of heat-resisting alloys, heat-resisting alloys with ceramic particles dispersed therein or heat-resisting alloy-impregnated ceramics. A heat-resisting supporting member according to the present invention is superior in insulating property and high-temperature compression resistance.

18 Claims, 5 Drawing Sheets

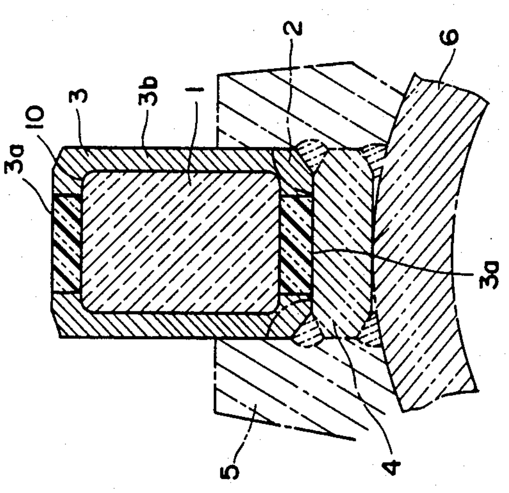
Fig. 1
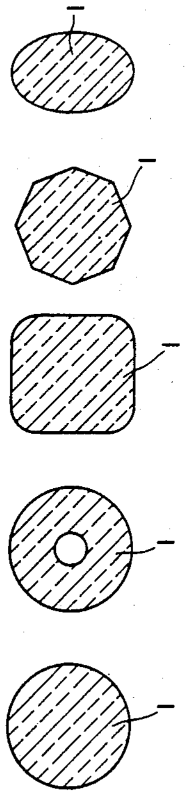
Fig. 2 (e)
Fig. 2 (d)
Fig. 2 (c)
Fig. 2 (b)
Fig. 2 (a)

HEAT-RESISTING SUPPORTING MEMBER

BACKGROUND OF THE INVENTION

1. Field of the Invention

The present invention relates to a heat-resisting supporting member, such as a skid button, provided on an upper surface of a skid in a heating furnace for directly supporting a heated material such as a steel material.

2. Description of the Prior Art

A steel material is transferred through an inside of a heating furnace to be heated at an appointed temperature. A skid supports the steel material during the transportation of the steel material. The skid has such a construction that a skid pipe for passing a cooling water therethrough is provided with a skid button fixedly mounted thereon for directly supporting the steel material and it is coated with an insulating material arranged along its periphery. And, this skid button must support the weight of the steel material in an atmosphere of high temperature, so that it is necessary for the skid button to have a great compression-creep strength at high temperature.

Accordingly, the skid button has been formed of heat-resisting steels or Co-base or Ni-Cr-base heat-resisting alloys or ceramics or composites comprising ceramics and metals.

It is necessary for the skid button formed of heat-resisting steels or alloys to be frequently renewed since a creep-deformation is generated on an upper surface of the skid button after using it for a long time in an atmosphere of high temperature, whereby a useful life time of the skid button is shortened. And, in order to reduce such a creep-deformation, a cooling water has been passed through said skid pipe but a problem has occurred in that a temperature of a portion brought into contact with the steel material is lowered, thereby generating skid marks on the steel material.

In order to solve the above described problem, a skid button formed of ceramics has been proposed. However, the conventional skid button of this type has a construction such that all of a surface brought into contact with a heated steel material is exposed to ceramics, so that a disadvantage has occurred in that a reaction occurs between the ceramics and oxidized scales or the atmosphere within the furnace causing wear of the ceramics. In addition, when the wear causes a difference of elevation on the skid button, or when the steel material is warped, a problem has occurred in that a shock load acts upon the skid button during the transportation of the steel material, whereby the ceramics are broken and scattered. Besides, the skid button formed of ceramics can not use welding as a means of fixedly mounting it on the skid pipe, so that it has required a special construction for fixedly mounting it on the skid pipe and has been expensive.

SUMMARY OF THE INVENTION

The present invention was achieved in view of the above described circumstances and thus it is a first object of the present invention to provide a heat-resisting supporting member to which a superior insulating property, a superior high-temperature compression-creep strength and a long useful life time are imparted by coating at least a part of a peripheral surface of a lower corner portion of a supporting aggregate which is a core comprising ceramics with a heat-resisting alloy and by coating the remaining portion of said peripheral surface with a shock-resisting substance.

It is a second object of the present invention to provide a heat-resisting member which can eliminate such disadvantages of ceramics as the inferior shock-resistance and the wear due to the reaction between them and oxidized scales of a heated material or an atmosphere within a furnace by coating the peripheral surface of the supporting aggregate mainly comprising ceramics with a shock-resisting substance.

It is a third object of the present invention to provide a heat-resisting supporting member which can be easily fixedly mounted on another member by coating at least a part of the peripheral surface of the lower corner portion of the supporting aggregate with a heat-resisting alloy.

It is a fourth object of the present invention to provide a heat-resisting supporting member to which a high-temperature compression-creep strength more superior to the heat-resisting alloy is imparted by using the heat-resisting alloy with ceramic particles dispersed therein or the material formed by impregnating porous ceramics having continuous air-pores with heat resisting alloys as the shock-resisting substance.

It is a fifth object of the present invention to provide a heat-resisting supporting member of which cost can be reduced by using a composite comprising ceramics and heat-resisting alloys as the supporting aggregate.

The above and further objects and features of the invention will more fully be apparent from the following detailed description with accompanying drawings.

BRIEF DESCRIPTION OF THE DRAWINGS

FIG. 1 is a front longitudinal sectional view showing a first preferred embodiment of the present invention;

FIGS. 2A–E are transverse sectional views showing various shapes of ceramics as supporting aggregates;

DETAILED DESCRIPTION OF THE PREFERRED EMBODIMENTS

Figure 3:
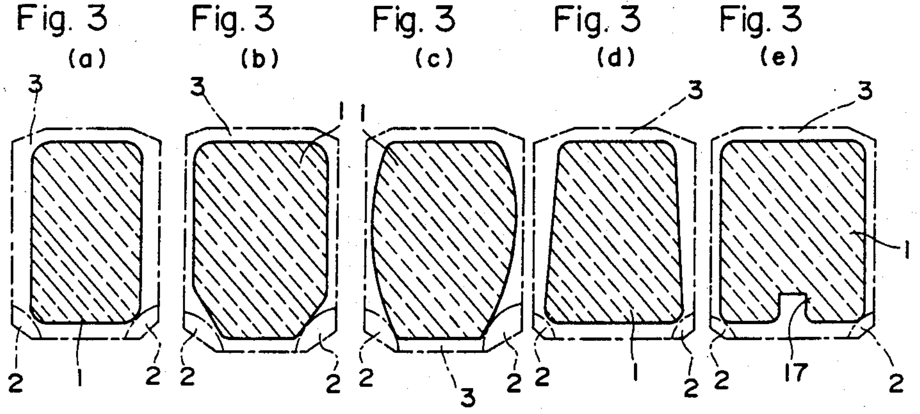
FIGS. 3A–E are longitudinal sectional views showing various shapes of ceramics as supporting aggregates.

The preferred embodiments of a skid button as a heat-resisting supporting member according to the present invention will be described below with reference to the drawings. At first, a skid button according to the first preferred embodiment of the present invention, in short a skid button, in which a supporting aggregate is formed of merely ceramics, is described. Referring now to FIG. 1 which is a front longitudinal sectional view showing a skid button according to the first preferred embodiment of the present invention, reference numeral 1 designates ceramics forming a supporting aggregate 10. All of a peripheral surface of a lower corner portion of the ceramics 1 is coated with a heat-resisting alloy 2 while the remaining peripheral surface is coated with a shock-resisting substance 3. In this preferred embodiment, of the shock-resisting substance 3 portion positioned at an upper portion and a lower portion of the skid button are coated with heat-resisting alloy-impregnated ceramics 3*a* while the remaining portions are coated with a heat resisting alloy 3*b*. That is to say, in this preferred embodiment the heat-resisting alloy-impregnated ceramics 3*a* serves to hold the ceramics 1 in the production of the skid button or to reinforce the shock-resisting substance 3 positioned on the upper surface and the lower surface of the ceramics 1. In addition, reference numeral 4 designates a bed seat, 5 designating an insulating material, and 6 designating a skid pipe.

Now, the ceramics 1 are not limited at all in shape. They may have a solid circular section as shown in FIG. 2 (*a*), a hollow circular section as shown in FIG. 2(*b*), a polygonal section as shown in FIG. 2(*c*) and FIG. 2(*d*) and an oval section as shown in FIG. 2(*e*). Also the longitudinal section may be uniform in the direction of height as shown in FIG. 3(*a*), in the form in which the lower portion requiring the weldability is an inversed frustum of cone as shown in FIG. 3(*b*), barrel-shaped as shown in FIG. 3(*c*), trapezoidal as shown in FIG. 3(*d*) and in the form in which the lower portion is partially hollowed, as shown in FIG. 3(*e*).

The shape of the longitudinal section of the ceramics 1 as shown in FIG. 3(*e*) compensates for a reduction of the strength against a horizontal force resulting from an increase of an area occupied by the ceramics 1 by the shock-resisting substance 3 existing in a hollow portion 17 of the lower portion and may be used together with the forms as shown in FIGS. 3(*a*) to (*d*).

Next, the shock-resisting substance 3 is described. The shock-resisting substance 3 is not limited at all in material but heat-resisting alloys, heat-resisting alloys with ceramic particles dispersed therein or heat-resisting alloy-impregnated ceramics are preferably used. Besides, the shock-resisting substance 3 may be uniform all over the area to be coated or partially different. For example, an upper portion or both the upper portion and a lower portion of the skid button exhibiting a particularly remarkable high-temperature compression-creep deformation can be coated with heat-resisting alloy-impregnated ceramics while the remaining portions are coated with heat-resisting alloys.

The heat-resisting alloy-impregnated ceramics have a three-dimensional frame structure, that is to say a structure in which heat-resisting alloys are impregnated in air-pores of a ceramic foam as the porous ceramics having continuous air-pores by the casting method. Since the heat-resisting alloy-impregnated ceramics are composites comprising ceramics and metals, they are superior to heat-resisting alloys and the like in high-temperature compression-creep strength and the wear of ceramics resulting from the reaction between them and oxidized scales or an atmosphere within a furnace is remarkably reduced in comparison with heat-resisting alloys and the like.

The heat-resisting alloy-impregnated ceramics preferably contain air-pores at a ratio of 60 to 80%. If the air-pores are contained at a ratio less than 60%, the shock-resistance is reduced whereas if the air-pores are contained at a ratio larger than 80%, the compression-resistance is deteriorated.

The heat-resisting alloys with ceramic particles dispersed therein are, for example, insulating alloys with ceramic particles having grain sizes of 1 to 5 mm contained therein. The content of ceramic particles is preferably about 50 to 80% by volume. The reasons for these ranges are the same as for the porosity in the ceramic foam.

In addition, a thickness of the shock-resisting substance 3 on the upper surface of the skid button is preferably in a range from 0.5 cm to 2.0 cm. A reason for this is that if the thickness of the shock-resisting substance 3 is larger than 2.0 cm, the high-temperature compression-creep deformation occurs in the shock-resisting substance layer of the upper surface of the skid button which brings about disadvantages similar to those in the conventional skid button formed of heat-resisting alloys while if it is less than 0.5 cm, the effect of coating the ceramics with the shock-resisting substance can not be exhibited.

In addition, in view of the coating property of the shock-resisting substance 3, the corner portions of the ceramics 1 as the supporting aggregate are preferably faced.

Besides, in order to make the welding of the skid button to the skid pipe 6 possible, it is desired that the same shape as that of the conventional skid button formed of heat-resisting alloys is imparted to the lower portion of the skid button and the shortest distance between the welded portion and the ceramics 1 is 15 mm or more.

Next, a method of producing the skid button according to this first preferred embodiment will be described.

Figure 4:
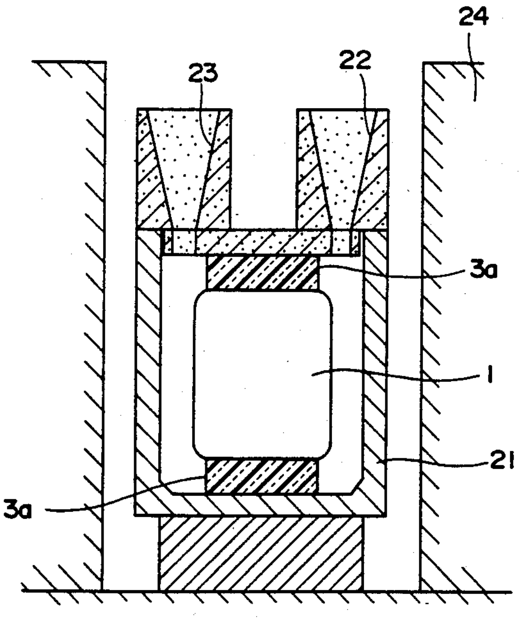
FIG. 4 is a diagram showing a method of producing a skid button according to a first preferred embodiment of the present invention.

As shown in FIG. 4, the heat-resisting alloy-impregnated ceramic 3*a* and the ceramics 1 are installed within, for example, an aluminous mold 21. And, a gate portion 22 and a riser portion 23 are provided on said heat-resisting alloy-impregnated ceramic 3*a*. In addition, said gate portion 22 and said riser portion 23 are sealed at a circumference thereof so that a molten metal may not leak out.

The mold 21 under such a condition is placed in an electric furnace 24, which can be preheated up to temperature of 1,300° C. or more, and heated at a temperature-rise ratio of sufficiently preventing said ceramics 1 from being damaged by a thermal shock (200° C./hr or less). After remaining at 1,300° C. for 2 hours, a Co-base heat-resisting alloy, for example, which has been molten in a separate furnace, is directly poured into the mold 21 at temperature of 1,500° C. from the upper portion of the electric furnace 24. After cooling, the mold 21 is dismantled and the upper and lower surfaces of the skid button are mechanically processed to some extent to obtain a finished skid button.

Figure 6:
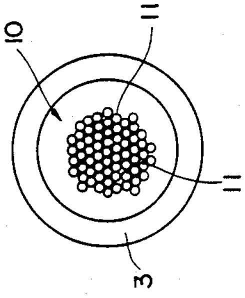
FIG. 6 is a sectional view of the embodiment shown in FIG. 5 taken along a line vi—vi thereof.
Figure 5:
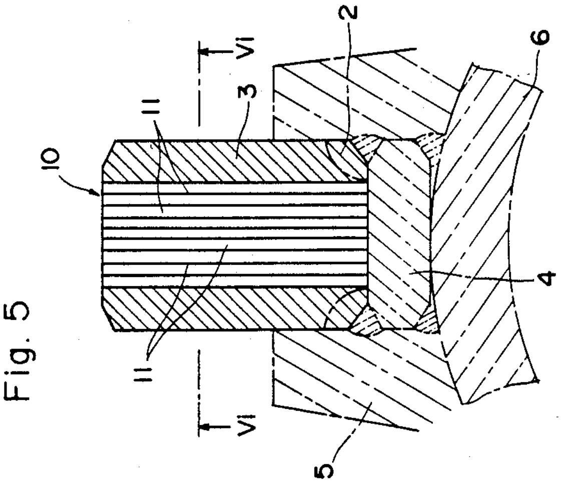
FIG. 5, 7, 8 are front longitudinal sectional views showing a second preferred embodiment of the present invention.

Next, the skid button according to the second preferred embodiment of the present invention, in short, the skid button whose supporting aggregate is formed of a composite comprising ceramics and heat-resisting alloys, will be described. The composite comprising ceramics and heat-resisting alloys is a ceramic bar assembly coated with heat-resisting alloys by molding, heat-resisting alloys with ceramic particles dispersed therein or heat-resisting alloy-impregnated ceramics. FIG. 5 is a front longitudinal sectional view showing one example of a skid button according to the second preferred embodiment and FIG. 6 is a sectional view of FIG. 5 taken along a line vi—vi thereof. In this example, a supporting aggregate 10 is obtained by tying up a large number of ceramic bars 11 in a bundle and coating the bundle with heat-resisting alloys by molding, all of the peripheral surface of the lower corner portions of said supporting aggregate 10 being coated with the heat-resisting alloy 2 while all of the remaining peripheral surface of said supporting aggregate 10 is coated with the shock-resisting substance 3.

In the example as shown in FIG. 5, although the shock-resisting substance 3 is coated on merely the side surface of the peripheral portion and not coated on the upper surface of the supporting aggregate, it goes without saying that also the upper surface of the supporting aggregate had better be coated with the shock-resisting substance 3.

Besides, although it is thought that the ceramic bars 11 exposed on the upper surface of the supporting aggregate have a problem in shock-resisting strength and the wear resulting from the reaction between ceramics and an atmosphere within a furnace in this example, since the heat-resisting alloys surrounding these ceramic bars 11 cover the upper end of said ceramic bars 11 by the use of the skid button in the case where the upper end of the ceramic bars 11 is broken or worn, thereafter the breakage by a shock and the wear by the reaction of ceramics can be prevented leaving no problem in use.

The heat-resisting alloys with ceramic bars dispersed therein include, for example, heat-resisting alloys with ceramic bars having diameters of 5 to 10 mm and formed of high-strength compact $Al_2O_3$ standing therein. In this case, an area ratio of the ceramic bars is preferable to be about 25 to 75%. That is to say, provided that a load of about 1 ton is applied to each skid button and at worst one piece of ceramic bars receives this load of 1 ton, a diameter of at least 5 mm is required. In addition, in view of the wear by a shock, the allowable maximum diameter is about 10 mm. Besides, it is the reason why said range of area ratio is desirable that in order to disperse a shock as far as possible to suppress the wear by a shock, an area ratio of at least 25% is required while in order to meet the requirements of an effective thermal insulation and the existence of the heat-resisting alloy layer to some extent among the ceramic bars for sufficiently restraining the ceramic bars by dint of the shock-resisting substance surrounding the ceramic bars, the area ratio of the ceramic bars must not exceed 75%.

The production of the skid button shown in FIG. 5 is performed as follows:

A large number of ceramic bars are tied in a bundle and the resulting bundle is set in the mold. The mold is placed in the electric furnace which can be preheated up to 1,300° C., and then heated at a temperature-rise ratio of preventing the ceramic bars from being damaged by a thermal shock (200° C./hr or less). After remaining at 1,300° C. for 2 hours, a Co-base heat-resisting alloy, for example, which has been molten in a separate furnace, is poured into the mold at a temperature of 1,500° C. from the upper portion of the electric furnace. After cooling, the mold is dismantled to obtain the supporting aggregate.

Subsequently, the resulting supporting aggregate is set within the mold and the heat-resisting alloy is molded in the same order as described in the first preferred embodiment, and then after cooling, the mold is dismantled and the upper and lower surfaces of the skid button are subjected to a mechanical processing to some extent to obtain a finished skid button.

Figure 8:
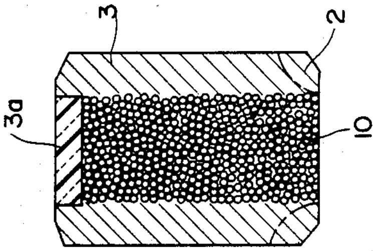
Figure 7:
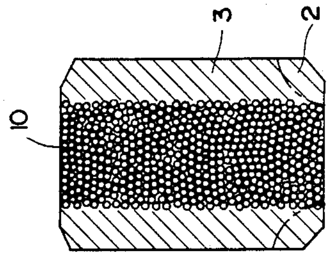

FIGS. 7, 8 are front longitudinal sectional views showing another example of the skid button according to the second preferred embodiment. In these examples heat-resisting alloys with ceramic particles dispersed therein are used as the supporting aggregate 10 and the remaining structure is the same as shown in the preferred embodiment shown in FIG. 5. In addition, in the preferred embodiment shown in FIG. 8, the upper surface of the supporting aggregate 10 is coated with, for example, the heat-resisting alloy-impregnated ceramic 3a.

Besides, it is desired that an incorporation ratio of ceramics in the supporting aggregate is 50% or more in average in the direction of height in a transverse section of the skid button in area-occupation ratio. This value of 50% is obtained on the basis of the strength and insulating property of the skid button. If this value is less than 50%, the desired strength and insulating property can not be obtained and an effective reduction of skid marks can not be achieved. In addition, the shock-resisting substance used for this second preferred embodiment of the skid button is the same as that used for the first preferred embodiment.

In this second preferred embodiment, since the supporting aggregate is formed of a composite comprising ceramics and heat-resisting alloys, the cost can be reduced in comparison with the first preferred embodiment in which the supporting aggregate is formed of merely ceramics.

Figure 10:
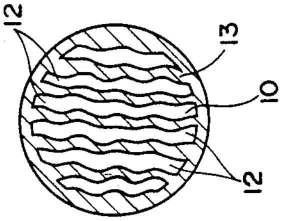
FIG. 10 is a sectional view of the embodiment shown in FIG. 9 taken along a line x—x thereof.
Figure 9:
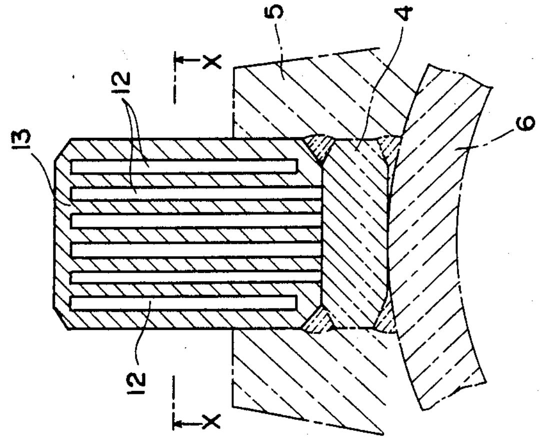

Next, the skid button according to the third preferred embodiment of the present invention, in short, the skid button, in which the supporting aggregate is formed of a composite comprising a plurality of symmetrical, flat or corrugated sheets or plates or bar ceramics and heat-resisting alloys interposed among the ceramics, will be described. FIG. 9 is a front longitudinal sectional view showing one example of the skid button according to this third preferred embodiment and FIG. 10 is a sectional view of FIG. 9 taken along a line x—x thereof. Referring to FIGS. 9, 10, reference numeral 12 designates a corrugated sheet-like ceramic. The supporting aggregate 10 is constructed from a plurality of said corrugated sheet-like ceramics 12 disposed at suitable intervals and coated with a heat-resisting alloy 13 by molding. And, in the skid button according to this example, although all of the peripheral surface of the lower corner portion of the supporting aggregate 10 is coated with a heat-resisting alloy while all of the remaining peripheral surface of the supporting aggregate 10 is coated with a shock-resisting substance, in this example shown in FIG. 9, the heat-resisting alloy 13 constructing the supporting aggregate 10 is used as both the heat-resisting alloy coating all of the peripheral surface of the lower corner portion of the supporting aggregate 10 and the shock-resisting substance coating all of the remaining peripheral surface of the supporting aggregate 10.

It is desired that the incorporation ratio of ceramics as the main ingredient in the supporting aggregate is in average 30 to 80% in the direction of height in area-occupation ratio of ceramics in a transverse section of the skid button. These values of 30% and 80% are determined on the basis of the strength and insulating property of the skid button and the incorporation ratio of ceramics less than 30% leads to the insufficient strength and insulating property of the skid button, whereby the effective reduction of skid marks can not be achieved. In addition, the incorporation ratio of ceramics in the supporting aggregate larger than 80% leads to the reduction of the restriction for ceramics, whereby the strength of the skid button is reduced.

Figure 13:
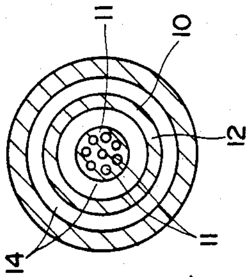
FIGS. 9, 11, 12, 13 are front longitudinal sectional views showing a third preferred embodiment of the present invention.
Figure 12:
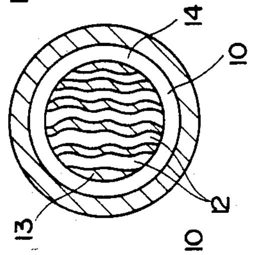
Figure 11:
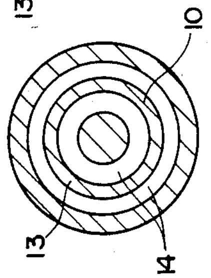

FIGS. 11, 12, 13 are transverse sectional views showing other examples of the skid button according to the third preferred embodiment. Referring to FIG. 11, cylindrical ceramics 14 having different diameters concentrically arranged and coated with the heat-resisting alloy 13 by molding are used as the supporting aggregate 10.

Referring to FIG. 12, the cylindrical ceramics 14 with a plurality of corrugated sheet-like ceramics 12 arranged therein at suitable intervals and coated with the heat-resisting alloy 13 are used as the supporting aggregate 10.

Referring to FIG. 13, ceramic bars 11 are arranged at a central portion of the supporting aggregate 10 as shown in FIG. 11.

In addition, flat plate-like ceramics (not shown) may be used in place of the corrugated sheet-like ceramics shown in FIGS. 9(10), 12.

Besides, although all of the peripheral surface is coated with the heat-resisting alloy in the above described preferred embodiments, only the side surface of the peripheral portion may be coated with the heat-resisting alloy without coating the upper surface.

It goes without saying that the shock-resisting substance may be formed of a material different from the heat-resisting alloy 13, as described in the first or second preferred embodiment, without using the heat-resisting alloy 13 as both the heat-resisting alloy coating all of the peripheral surface of the lower corner portion and the shock-resisting substance coating the remaining portion.

Next, a method of producing the skid button according to the third preferred embodiment (FIG. 9) will be described.

The ceramics are arranged in a mold and a heating gas is supplied in the mold through a gate to preheat the ceramics up to about 1,200° C. It goes without saying that the ceramics are heated at a temperature-rise rate of preventing the ceramics from being damaged by a thermal shock (200° C./hr or less). After remaining at such a temperature for 2 hours, a Co-base heat-resisting alloy, for example, which has been molten in a separate furnace, is poured into the mold. After cooling, the mold is dismantled to obtain the supporting aggregate. In this preferred embodiment, since the heat-resisting alloy constructing the supporting aggregate is used as both the shock-resisting substance and the heat-resisting alloy for coating the peripheral surface of the supporting aggregate, it is necessary only to form the supporting aggregate in a size of the skid button.

Next, the skid button according to the fourth preferred embodiment of the present invention, in short, the skid button, in which the supporting aggregate is integrated with the shock-resisting substance and they are formed of the same material, will be described. Ceramic particles, heat-resisting alloys with ceramic bars dispersed therein or heat-resisting alloy-impregnated ceramics are used as materials for forming the supporting aggregate and the shock-resisting substance.

Figure 15:
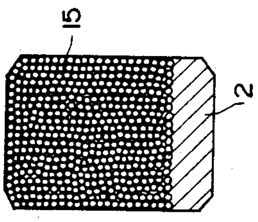
Figure 14:
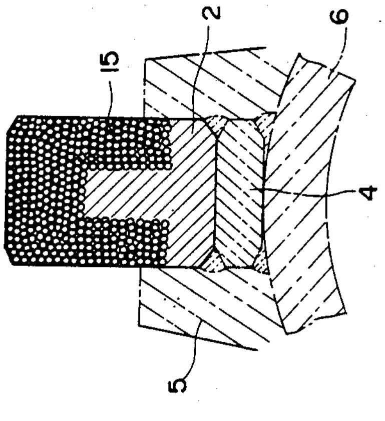

In FIG. 14, the heat-resisting alloy 2 is provided in the central portion and the lower end portion below the vicinity of the central portion in the direction of height, whereby improving the shock resistance even though the insulating property is sacrificed to some extent. In addition, in FIG. 15, the heat-resisting alloy 2 is provided only in the lower end portion to aim at only the improvement of the weldability. And, since the supporting aggregate can be produced by integrally molding the heat-resisting alloy 2 and the heat-resisting alloy 15 with ceramic particles dispersed therein in these preferred embodiments shown in FIGS. 14, 15, the reduction of the strength does not occur in the boundary portion of both heat-resisting alloys 2, 15.

Figure 16:
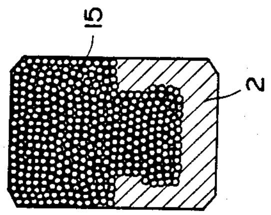

Furthermore, in FIG. 16, the boundary portion of said heat-resisting alloys 2, 15 is formed so as to be engageable with each other and the supporting aggregate is produced by coating the heat-resisting alloy 15 with ceramic particles dispersed therein previously molded in the appointed shape with the heat-resisting alloy 2 by molding, whereby preventing the heat-resisting alloy 15 with ceramic particles dispersed therein from escaping and improving the weldability of the skid button.

Figure 18:
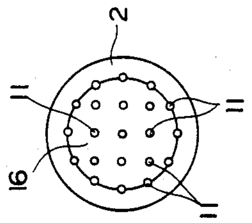
FIG. 18 is a transverse sectional view of the embodiment shown in FIG. 17.
Figure 17:
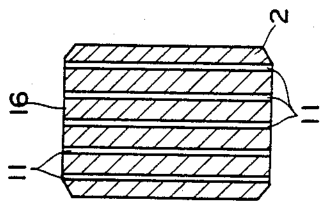
FIGS. 14, 15, 16, 17 are front longitudinal sectional views showing a fourth preferred embodiment of the present invention.

In FIGS. 17, 18, the peripheral side surface of a heat-resisting alloy 16 with the ceramic bars 11 dispersed therein is coated with the heat-resisting alloy 2.

Also in this preferred embodiment, since the ceramic particles or the ceramic bars are exposed on the upper surface, a problem seems to occur in points of the shock resistance and the wear of ceramics by the reaction but in fact no problem occurs on account of the reason being the same as described in the second preferred embodiment.

The production of the skid button according to the preferred embodiment shown in FIG. 17 is carried out as follows:

At first, the ceramic bars are arranged in a dispersed manner in a mold at the desired intervals, and then the mold is placed within an electric furnace, which can be preheated up to 1,300° C. or more, for example, and heated at a temperature-rise rate of preventing the ceramic bars from being damaged by the thermal shock (200° C./hr or less). After remaining at such a temperature for 2 hours, a Co-base heat-resisting alloy, for example, which has been molten in a separate furnace, is poured into the mold at a temperature of 1,500° C. from the upper portion of the electric furnace. After cooling, the mold is dismantled and the upper and lower surfaces of the skid button are subjected to the mechanical processing to some extent to produce the skid button.

And, in this preferred embodiment, since the supporting aggregate, the shock-resisting substance and the heat-resisting alloy on the corner portion are integrally molded, they are easy to produce.

Besides, although in the above described preferred embodiments, all of the peripheral surface of the lower corner portion of the supporting aggregate is coated with the heat-resisting alloy, a part of the peripheral surface of the corner portion may be coated with the heat-resisting alloy if the welding is possible.

Next, the characteristics of the skid button according to the present invention are described.

(1) Insulating property

Since ceramics superior to metals in insulating property are used as the main ingredient of the supporting aggregate, the skid button according to the present invention exhibits a superior insulating property. Although a low heat conductivity of the ceramics used is more desirable, the experiments by the present inventor have shown that a highly effective reduction of skid marks can be achieved in the case where the ceramics having a heat conductivity of at least ⅓ time that of metals or less are used.

(2) High-temperature compression-creep strength

Since ceramics superior to the usual insulating materials in high-temperature compression resistance are used as the main ingredient of the supporting aggregate, the useful life time of the skid button can be prolonged. According to the inventor's experiments, the useful life time of the conventional skid buttons, such as the skid button formed of heat-resisting steels and the skid button formed of ceramics is a half year or less while that of the skid button according to every preferred embodiment of the present invention is two years or more.

(3) Shock-resistance and the prevention of the wear of ceramics due to the reaction Although ceramics exhibit superior results in insulating property and high-temperature compression-creep strength, they have disadvantages in, for example, that they are inferior in shock-resistance and they are worn by the reaction between them and oxidized scales of the heated material or an atmosphere within a furnace. In the skid button according to the present invention, all of the peripheral surface of the lower corner portion of ceramics as the supporting aggregate is coated with heat-resisting alloys while all of the remaining peripheral surface is coated with shock-resisting substances, whereby the disadvantages incidental to ceramics can be eliminated.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A heat-resistant support member, comprising:

(a) a central core comprising a ceramic material;

(b) at least a portion of a peripheral surface of a lower corner portion of said support member comprising a weldable, heat-resistant alloy; and (c) the remainder of the peripheral surface of said support member comprising a layer of a heat-resistant alloy or a layer of a composite comprising a heat-resistant alloy and a ceramic material, wherein the portion of said layer which constitutes the upper surface of said support member has a thickness of from 0.5 cm to 2.0 cm, said central core comprising an aggregate formed of a composite comprising a heat-resistant alloy having ceramic particles dispersed therein, said ceramic material comprising about 25 to 80% by volume of said aggregate and said ceramic particles having a grain size in the range of from 1-5 mm.

2. A heat-resistant support member as set forth in claim 1, in which said ceramic material has a heat conductivity value of about ⅓ or less that of said heat-resistant alloy.

3. A heat-resistant support member as set forth in claim 1, in which said ceramic particles comprise about 50 to 80% by volume of said aggregate.

4. A heat-resistant support member as set forth in claim 1, in which said composite layer is a mixture comprising heat-resisting alloys and a material formed by impregnating porous ceramics having continuous air-pores with heat-resistant alloys.

5. A heat-resistant support member as set forth in claim 1, which said ceramic particles comprise about 50 to 80% by volume of said composite layer.

6. A heat-resistant support member as set forth in claim 1, in which said composite layer is a mixture comprising a heat-resistant alloy and a material formed by impregnating with a heat-resistant alloy a porous ceramic having continuous air-pores.

7. A heat-resistant support member as set forth in claim 1, wherein said central core comprises said ceramic particles contained in a solidified melt of said heat-resistant alloy.

8. A heat-resistant support member as set forth in claim 1, in which said composite layer is formed of a material formed by impregnating porous ceramics having continuous air-pores with heat-resistant alloys.

9. A heat-resistant support member as set forth in claim 8, in which the porosity of said porous ceramic composite layer is 60 to 80%.

10. A heat-resistant support member as set forth in claim 1, in which said composite layer is formed of heat resistant alloys with ceramic particles dispersed therein.

11. A heat-resistant support member as set forth in claim 10, in which said ceramic particles comprise about 50 to 80% by volume of said composite layer.

12. A heat-resistant support member as set forth in claim 1, in which said central core is integrally formed with an upper peripheral surface layer and both said core and said layer are formed of the same material.

13. A heat-resistant support member as set forth in claim 12, in which said same material is formed of a composite comprising a heat-resistant alloy having ceramic particles dispersed therein, wherein said ceramic particles comprise about 50 to 80% by volume of said composite.

14. A heat-resistant support member as set forth in claim 1, in which said composite layer is formed of a material comprising a porous ceramic material having continuous air-pores, said air-pores being impregnated with a heat-resistant alloy.

15. A heat-resistant support member as set forth in claim 14, in which the porosity of said porous ceramic composite layer is from 60 to 80%.

16. A heat-resistant support member as set forth in claim 1, in which said composite layer is formed of a heat-resistant alloy having ceramic particles dispersed therein.

17. A heat-resistant support member as set forth in claim 16, in which said composite layer ceramic particles comprise about 50 to 80% by volume of said composite layer.

18. A heat-resistant support member as set forth in claim 17, wherein said composite layer ceramic particles have a grain size in a range of from 1 to 5 mm.

* * * * *